United States Patent

[11] 3,599,068

[72] Inventors Taka-aki Kanamori;
Yasutsugu, Kuroda, both of Kamakura, Japan
[21] Appl. No. 784,856
[22] Filed Dec. 18, 1968
[45] Patented Aug. 10, 1971
[73] Assignee Mitsubishi Denki Kabushiki Kaisha
Tokyo, Japan
[32] Priority Dec. 22, 1967
[33] Japan
[31] 42/82343

[54] LOCATING SPEED REDUCTION DEVICE
2 Claims, 11 Drawing Figs.
[52] U.S. Cl. .................................................. 318/600, 318/603
[51] Int. Cl. ...................................................... G05b 19/28
[50] Field of Search ............................................ 318/20.300, 20.320

[56] References Cited
UNITED STATES PATENTS
| | | | |
|---|---|---|---|
| 3,110,865 | 11/1963 | Scuitto .......................... | 318/162 X |
| 3,211,976 | 10/1965 | Brule et al. .................. | 318/162 X |
| 3,439,241 | 4/1969 | Martens ....................... | 318/28 X |

*Primary Examiner*—Benjamin Dobeck
*Attorneys*—Robert E. Burns and Emmanuel J. Lobato ABSTRACT: A numerically controlled machine tool is first moved at a constant speed determined by a corresponding speed information signal until it reaches a predetermined distance from its command position. Then a position information signal representing the distance of movement of the member is coupled to control the pulse repetition frequency of a variable frequency oscillator having its output coupled to a position counter, thereby causing the counter to count down. The number of pulses in the form of a phase of square waveform is compared with the actual position of the member in the similar form and a difference between them is used to energize a drive device for the member. When the counter clears, the member reaches its command position and stops.

3,599,068

LOCATING SPEED REDUCTION DEVICE

BACKGROUND OF THE INVENTION

This invention relates to improvements in a position locating speed reduction device for use in numerical control of machine tools.

It has been previously practiced to first move a controlled member involved at a first predetermined fixed speed and then decelerate it along a predetermined reduction curve to a second predetermined fixed speed less than the first speed followed by its movement at the second speed and so on until the controlled member is stopped at its command position. Therefore, it has been required that the controlled member should begin to be decelerated at a position remote from the command position in order to ensure that the member is prevented from overshooting the command position. This measure has caused a reduction time to be long while increasing the dispersion of the reduction time to the speed of the controlled member. Also the working efficiency has been low. In addition, the reduction curves along which the controlled member is decelerated are not smooth and, consequently the associated workpieces develop rough surfaces and the machine and tool are subjected to high shocks.

Accordingly it is a general object of the invention to eliminate the above-mentioned disadvantages.

It is another object of the invention to provide a new and improved locating speed reduction device for use in numerical control of machine tools to decelerate a controlled member in a stepless manner, and to decrease the time of speed reduction thereby to increasing the working efficiency.

It is still another object of the invention to provide a new and improved locating speed reduction device for use in numerical control of machine tools to provide a time of speed reduction maintained substantially constant regardless of the speed of a controlled member involved.

SUMMARY OF THE INVENTION

With the above cited objects in view, the invention resides in a locating speed reduction device for use in a numerical control apparatus for a machine tool including a controlled member. The invention is further characterized by means for providing a signal determined by a distance between the actual and command positions of the controlled member, said signal to be used as a reduced speed signal immediately before the controlled member is caused to stop at the command position.

In a preferred embodiment of the invention, the locating speed reduction device may comprise a drive for the controlled member, first means for providing a speed information signal representing a speed of the controlled member, second means for providing a position information signal representative of a distance by which the controlled member is to be moved, voltage comparing and switching means operatively coupled to the first and second means to permit one of said signals to pass therethrough depending on the relative magnitude of the signals variable frequency oscillator means operatively connected to the voltage comparing and switching means to produce pulses at a pulse repetition frequency controlled by the voltage comparing and switching means, residual distance sensor means operatively connected to the second means to monitor the latter to permit the pulses from the variable frequency oscillator means to be applied to the second means as long as the second means has its digital information still remaining therein, the pulses from the oscillator means applied to the second means being counted down by the latter to decrease the value of the digital information on the second means position detector means for detecting the actual position of the controlled member; and phase difference detector means for detecting a phase difference between the output from the variable frequency oscillator means and the output from the position detector means to provide a reduced speed signal for energizing the drive.

BRIEF DESCRIPTION OF THE DRAWINGS

The invention will become more readily apparent from the following detailed description taken in conjunction with the accompanying drawings in which.

DESCRIPTION OF THE PREFERRED EMBODIMENT

Figure 1:
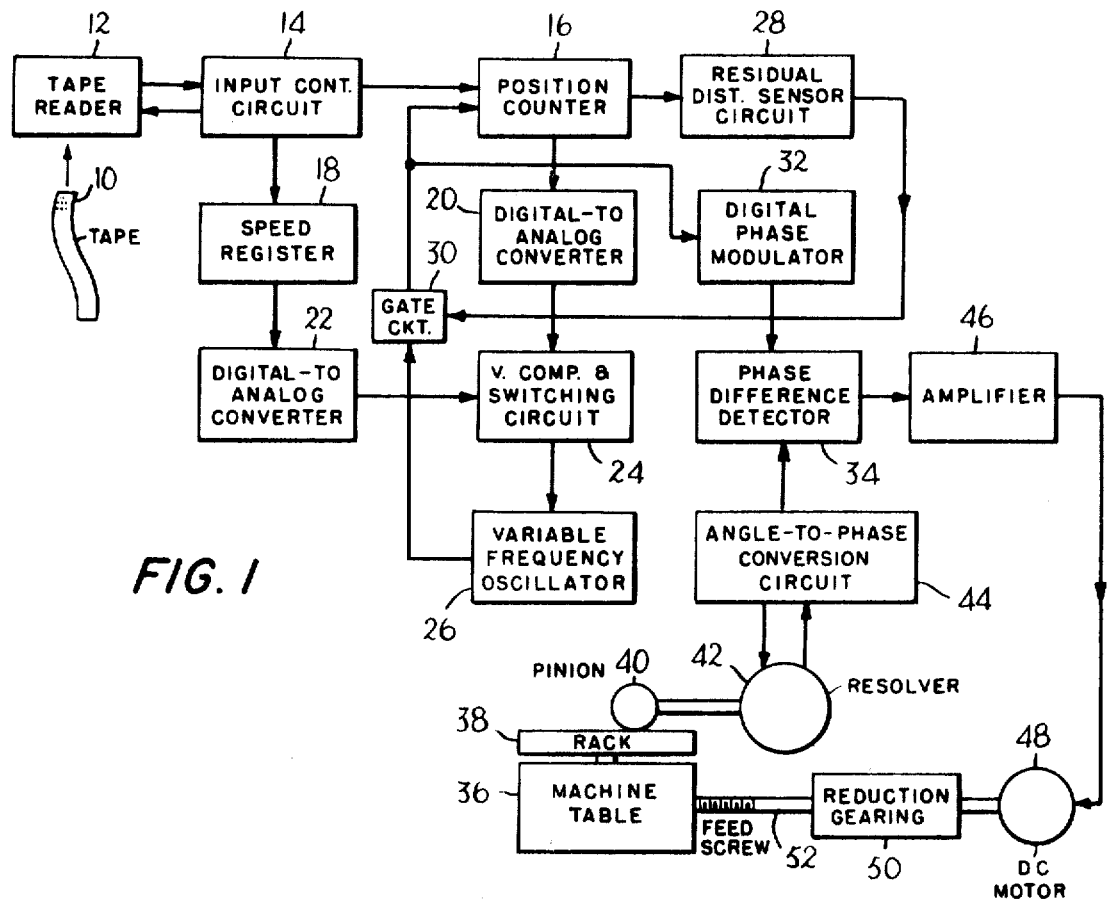
FIG. 1 is a block diagram of a locating speed reduction device constructed in accordance with the principles of the invention.

Referring now to FIG. 1 of the drawings, a tape 10 shown as being a punched tape is adapted to be stepwise fed into a tape reader 12 where a first set of position and speed informations recorded on the tape are read out. The position information represents a distance by which a controlled member such as a workpiece or a cutting tool is to be moved at a time while the speed information represents a speed at which the controlled member is to be moved. The position and speed informations read out by the tape reader 12 are applied through an input control circuit 14 to a position counter 16 and a speed register 18 respectively. The position information registered in the counter 16 is applied to a digital-to-analog converter 20 to be converted to a corresponding DC voltage and the speed information registered in the register 18 is similarly applied to another digital-to-analog converter 22 to be converted to a corresponding DC voltage. The DC voltages from both the converters 20 and 22 are supplied to a voltage comparing and switching circuit 24 as will be more fully described hereinafter. The circuit 24 has connected thereto a variable frequency oscillator 26 adapted to provide pulses at a repetition frequency determined by the output from the comparing and switching circuit 24.

The position counter 16 is also connected to a residual distance sensor circuit 28 operative to monitor the particular digital value contained in the position counter 16 and also to sense when the digital value registered in counter is cleared or equal to zero. In other words, the sensor circuit 28 serves to estimate a distance between the actual and command positions of the controlled member. If the sensor circuit 28 has sensed that the digital value still remains in the position counter 16, it gates a gate circuit 30 to permit the pulses from the oscillator 26 to pass to both the position counter 16 and a digital phase modulator 32. One form of the digital phase modulator is described in the copending application, Ser. No. 784,842 filed Dec. 18, 1968, by H. Hyoguchi, T. Kanamori and Y. Kuroda for "Locating Device" and assigned to the same assignee. The counter 16 counts the pulses applied thereto down to zero resulting in a progressive decrease in digital value remaining therein. On the other hand, the phase modulator 32 serves to convert the number of pulses applied thereto to a phase of low frequency square wave. That is, the modulator 32 is a type of digital-to-analog converter. The output of the phase modulator 32 is connected to a phase difference detector 34.

FIG. 1 also illustrates a movable machine table 36 having positioned thereon a controlled member, (not shown) and having fixed thereto a rack member 38 which, in turn, meshes a pinion gear 40. The pinion gear 40 is mechanically coupled to a position detector for detecting the actual position of the table 36 and hence the controlled member. The position detector 42 is preferably a resolver capable of detecting an angle through which the associated rotor, in this case the pinion gear 40, has been rotated from its reference position. The output from the resolver 42 is applied to an angle-to-phase conversion circuit 44 to be converted to the corresponding electrical quantity which is, in turn, supplied to the above-mentioned phase difference detector 34. Such an angle-to-phase conversion circuit is described in the copending application as above cited.

The detector 34 detects a phase difference between the outputs from the phase modulator and conversion circuits 34 and 44 respectively. After having been amplified by an amplifier 46, the output from the detector 34 is applied to a DC motor 48 for energization. The energized motor 48 rotates through a reduction gearing 50 a feed screw 52 thereby to move the machine table 36 and therefore the rack member 38. The new position of the move machine table 36 is transmitted to the conversion circuit 44 in the manner as above described. It is noted that the rack member 38, the pinion gear 40, the resolver 42, and the conversion circuit 44, a negative feedback circuit around the driver for the machine table 36. Thus the machine table 36 exactly follows the output from the phase modulator 32.

Figure 2:
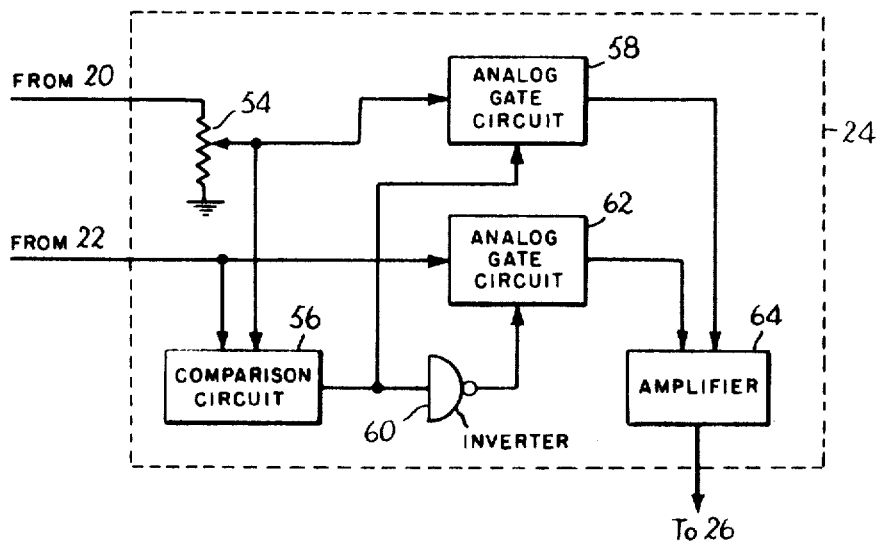
FIG. 2 is a block diagram illustrating in more detail one portion of the device shown in FIG. 1.

Referring now to FIG. 2, it is seen that the voltage comparing and switching circuit 24 comprises a variable resistor 54 having one end connected to the output of the digital-to-analog converter 20 and the other end connected to ground. The output of the digital-to-analog converter 22 is connected to one input to a comparison circuit 56, which has another input connected to a movable arm on the variable resistor 54. The output of the comparison circuit 56 is directly connected to one input to a first analog gate circuit 58 and also connected through an inverter 60 to one input to a second analog gate circuit 60 with the other inputs to both gate circuits 58 and 62 connected to the arm on the resistor 54 and the output of the converter 22 respectively. Then the gate circuits 58 and 60 are connected to an amplifier 64 which is in turn, connected to the above-mentioned variable frequency oscillator 26.

The comparison circuit 56 compares the output from the position converter 20 with the output from the speed converter 22 and therefore the digital value contained in the position counter 16 with the digital value registered in the speed register 18. If the position counter 16 is greater in digital value than the speed register 18 then the comparison circuit 56 provides a control signal adapted to be applied through the inverter 60 to the second gate circuit 62 to gate it thereby to permit the DC voltage from the speed converter 22 to pass therethrough to the amplifier 64. That control signal is also applied to the gate circuit 58 but it has no effect upon that circuit. On the other hand, if the speed register 18 is greater in digital value than the position counter 16 then the comparison circuit 56 provides a control signal enabling the first gate circuit 58 to permit the DC voltage from the variable resister 54 and therefore the converter 20 to pass therethrough to the amplifier 64. The last-mentioned control signal is also applied to the gate circuit 62 through the inverter 60 with no effect. Thus it will be appreciated that only one of the gate circuit 58 or 62 can be gated at a time. Thus the variable frequency oscillator 26 is adapted to be controlled with either one of the DC voltages delivered by the converters 16 and 22 as the case may be and amplified by the amplifier 64 to produce the oscillation frequency proportional to the particular voltage applied thereto. Thus the oscillator 26 provides output pulses whose repetition frequency corresponds to a speed at which the machine table 36 is translated.

With the arrangement illustrated, the machine table 36 is moved in accordance with output pulses from the variable frequency oscillator 26. As the table 36 is moved toward its command position, the position counter 16 counts down whereby the digital-to-analog converter 20 becomes less in magnitude of output than the digital-to-analog converter 22.

Referring now to FIG. 3a wherein the axis of ordinates represents an output voltage and the axis of abscissas represent a distance it is seen that the output voltage from the position converter 20 or across the arm and the grounded end of the variable resistor 54 linearly decreases as the machine table 36 is moved toward the command position thereof until the voltage is zero at the command position of the table. On the other hand, the speed converter 22 selectively provides a plurality of constant DC voltages labeled "SPEED 1," "2" and "3" as shown in FIG. 3b wherein the axis of ordinates and abscissas have the same meaning as in FIG. 3a. These constant voltages have been predetermined by the speed informations recorded on the tape 10. In FIG. 3c the axis of ordinates represents the pulse repetition frequency provided by the variable frequency oscillator 26 and the axis of abscissas represents the distance. The slope K of the straight line shown in each of FIGS. 3a and c can be continuously adjusted by the variable resistor 54.

Figure 3:
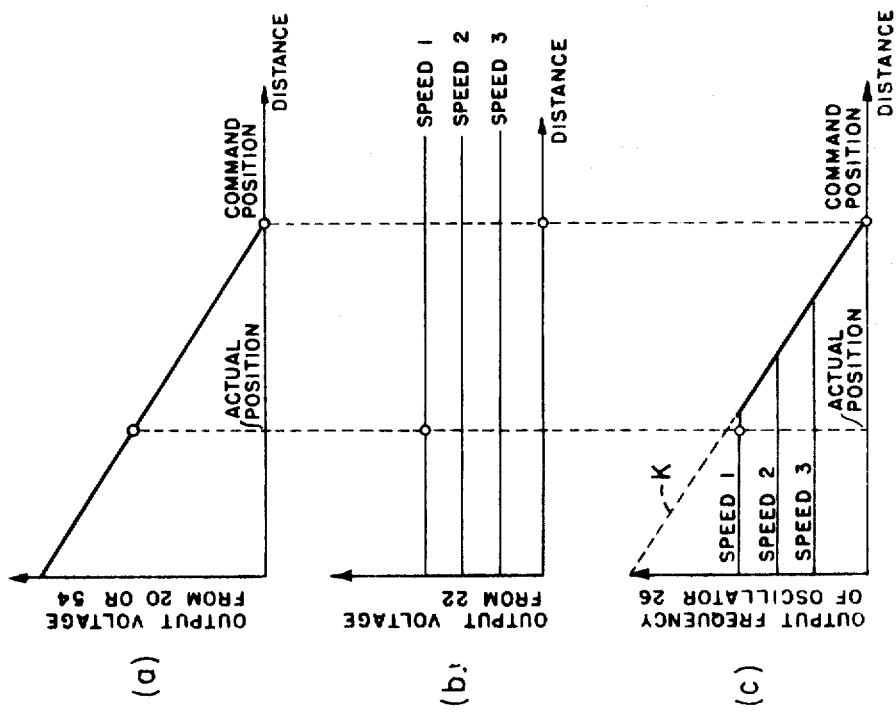
FIGS. 3a, b and c are curves plotting outputs from certain components of the device shown in FIG. 1 against a distance of a controlled member relative to a reference point.

It is now assumed that the machine table 36 has been located in its position labeled "ACTUAL POSITION" in FIG. 3 and that the speed converter 22 is providing its output labeled "SPEED 1" which is the highest because the machine table 36 has been remote away from its command position. Under the assumed condition, the machine table 36 is first translated toward its command position at a speed corresponding to the output or "SPEED 1" provided by the speed converter 22 (see FIG. 3c) until the position converter 20 coincides in magnitude of the output to the speed converter 22. This means that the machine table 36 has reached a predetermined distance measured from the particular command position. Thereafter the voltage comparing and switching circuit 24 is allowed to pass the output from the position converter 20 therethrough as previously described and the phase difference detector 34 provides a reduced speed signal. Therefore the machine table 36 decelerates along the line having the slope K as shown in FIG. 3a or c while at the same time the position counter 16 counts down. Eventually the machine table 36 will reach its command position whereupon the counter 16 clears away. At the same time the speed becomes null with the result that the machine table 36 stops at the command position. If the machine table 36 is first translated at a speed corresponding to "SPEED 2" or "3" (see FIG. 3b) it will be understood that it decelerates in the same manner as above described excepting that the deceleration is initiated a distance near to the command position as compared with the case of "SPEED 1."

Thereafter the tape recorder 12 reads out the succeeding informations and the process as above described is repeated to complete the particular program.

A change in speed of the moving machine table 36 in process of speed reduction will now be described with reference to FIGS. 4a, b and c. In FIG. 4a the axis of ordinates represents the speed $v(t)$ of the machine table 36 and the axis of abscissas represents the position $x(t)$ of the table relative to its reference point or a distance thereof from its reference position. FIG. 4b illustrates a curve plotting the relative position $x(t)$ of the table in ordinates against time $t$ in abscissas and FIG. 4c illustrates a curve plotting the speed $v(t)$ of the table in ordinates against time $t$ in abscissas.

Figure 4:
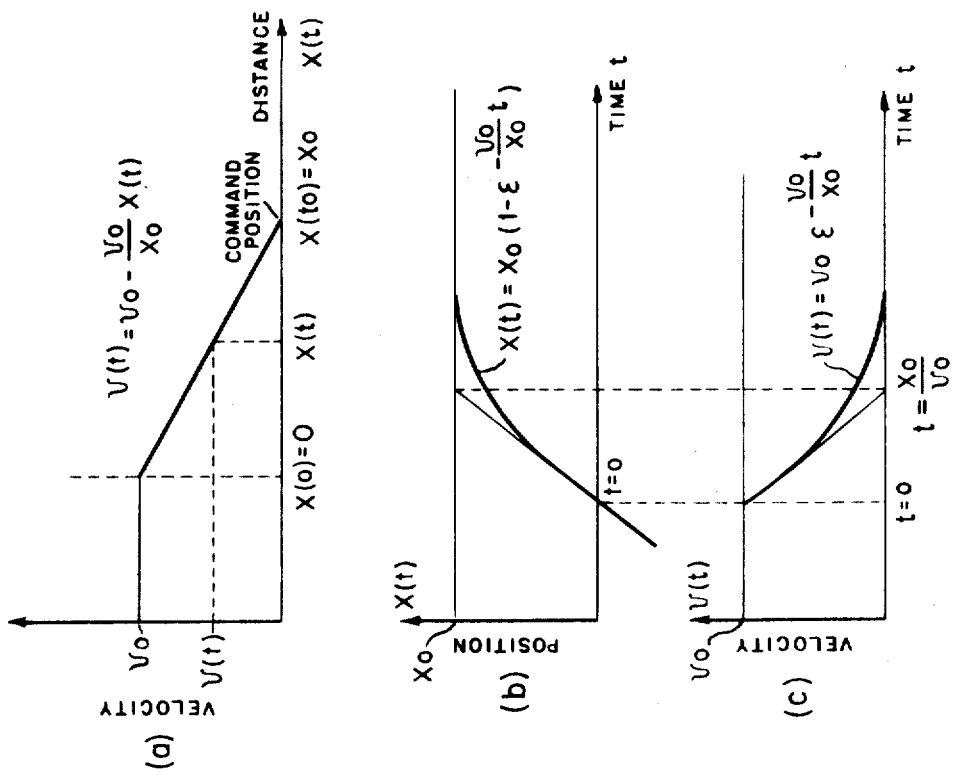
FIG. 4a is a graph plotting a speed of a controlled member against its distance in the process of speed reduction according to the principles of the invention.
FIG. 4b is a graph plotting the position of the controlled member against time.
FIG. 4c is a graph plotting the speed against time in the process of speed reduction according to the principles of the invention.

It is now assumed that the particular deceleration has been initiated at a time $t=0$, a speed $v(0)=v_o$ and a position or distance $x(o)=0$ as shown in FIG. 4 and that the particular command position is at $x(t_o)=x_o$. Thus the machine table has located a distance of $x_o$ measured from the command position thereof at the beginning of the reduction process. After the machine table has decelerated, it is moved at a speed $v(t)$ expressed by the equation $$v(t) = v_0 - \frac{v_0}{x_0} x(t) \quad (1)$$

where $v_0$ is a constant speed determined by the speed converter 22. From the equation (1) the time $t$ can be calculated as follows:

$$t = \int_0^t dt = \int_0^x \frac{dt}{dx} dx \int_0^x \frac{1}{\frac{dx}{dt}} dx = \int_0^x \frac{1}{v_0 - \frac{v_0}{x_0} x} dx \quad (2)$$

Integrating the righthand side of the Equation 2, we obtain $$t = \frac{1}{\frac{v_0}{x_0}} \left| \log_\epsilon \left( v_0 - \frac{v_0}{x_0} x \right) \right|_0^x \frac{-v_0}{x_0} t$$

$$= \log_\epsilon \left( v_0 - \frac{v_0}{x_0} x \right) - \log_\epsilon v_0 = \log_\epsilon \left( 1 - \frac{x}{x_0} \right)$$

where $\epsilon$ is the base of Napierian logarithm. Then $$x(t) = x_0 \left( 1 - \epsilon^{\frac{-v_0}{x_0} t} \right) \quad (3)$$

A Substituting the equation (3) in the equation (1) yields the equation $$v(t) = v_0 \epsilon^{-\frac{v_0}{x_0} t} \quad (4)$$

The above equations are illustrated in FIGS. 4a, b and c. More specifically, FIG. 4a shows a curve along which the cutting or feed speed decelerates as FIG. 3c, and FIGS. 4b and c illustrate curves described by the equations (3) and (4) respectively. Under these circumstances the time constant T is equal to $x_0/v_0$ and the slope K is equal to $v_0/x_0$. Thus the time constant T is determined by the slope K or the position of the arm on the variable resister 54. It will be appreciated that while a plurality of speeds such as "SPEED 1," "2" and "3" have been originally established the deceleration is effected with the same time constant because it follows the straight line having the slope K.

Also the equation (4) describes a step response or indicial response exponentially varying which, in turn, corresponds to that of the drive for the machine table 36. Strictly speaking, the equation (3) will have its value equal to $x_0$ for $t=\infty$. However, the machine table 36 can be located in any desired position at a high speed provided that a predetermined speed preventing the machine table from overshooting is added, as a bias, to the speed $v(t)$.

Thus it will be appreciated that the invention has provided a novel numeral control for controlling machine tools in which a speed at which a controlled member is moved toward its command position is determined by a numeral information corresponding to the particular distance of the controlled member measured from the command position thereof. This leads to the advantages that the controlled member is prevented from overshooting the command position, an optimum deceleration curve is obtained fitted to the particular drive for the controlled member, and that the deceleration distance and time decrease while the machine tool is only subject to low shocks.

Figure 5:
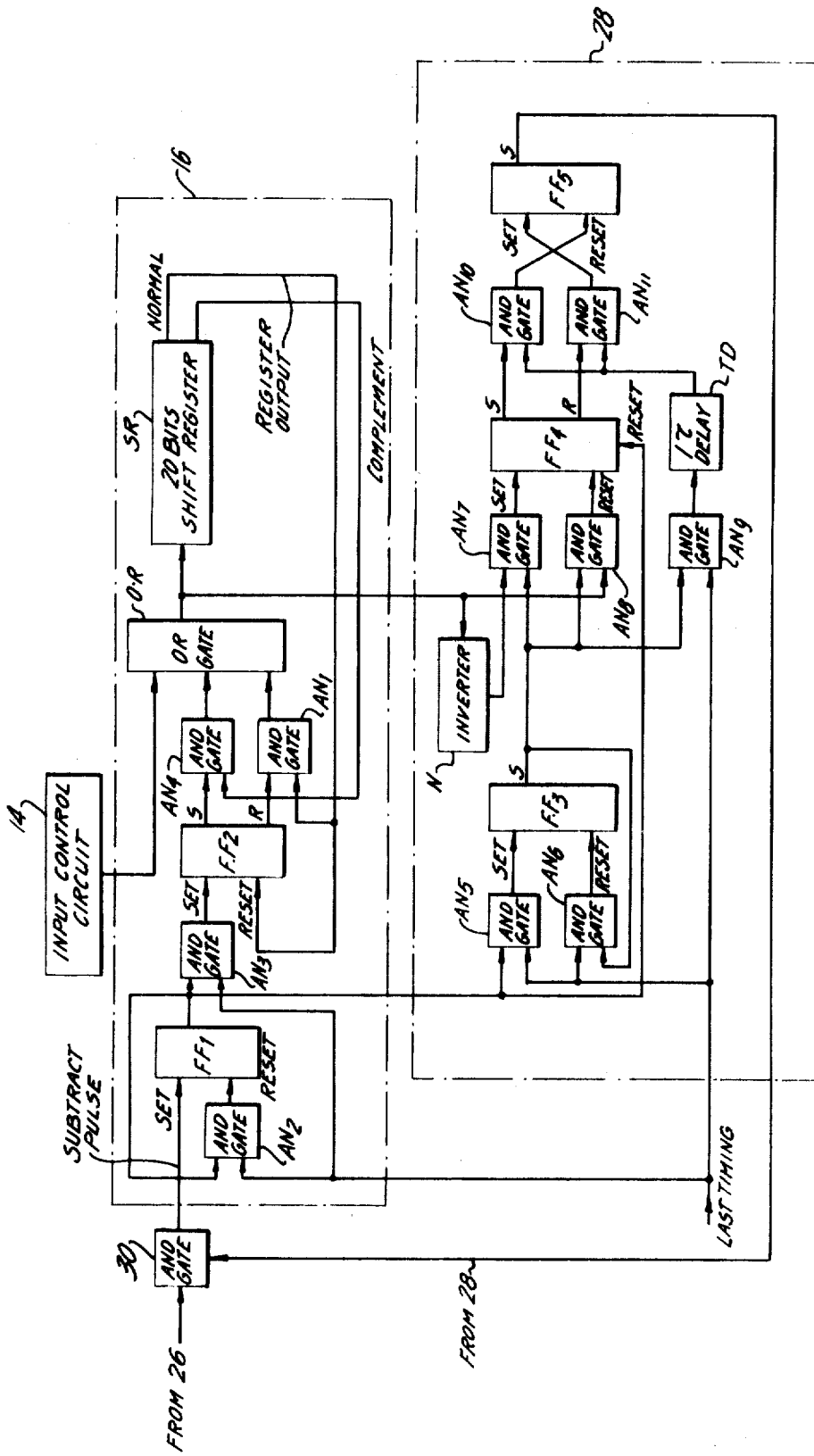
FIG. 5 is a block diagram illustrating the details of the sensor circuit shown in FIG. 1.

In further explanation of the sensor circuit 28, the system clock pulses serve to determine a time point when each of the flip-flops, as shown in FIG. 5, is operated with the trailing edge of the associated pulse. Such pulses are always applied to the flip-flops. On the other hand each of the last timing pulse occurs simultaneously with the twentieth system clock pulse to determine a turn-on or -off time for each of the AND gates as shown in FIG. 5.

More specifically, with the machine table 36 set to effect a movement of 48 mm. The table 36 follows the time sequence of FIG. 6 to move from its set point of 48 mm. by a distance of 1 mm to reach a point of 47 mm. during a change from 48 to 0. A subtract pulse determines whether or not "1" is subtracted from the set value of "48." The application of one subtract pulse causes "48" to change to "47." Then the application of one subtract pulse causes "47" to change to "46." In other words, the number of subtract pulses are subtracted from the initially set value.

Only for purpose of explanation, flip-flop's $FF_1$, $FF_2$, $FF_3$ and $FF_4$ have binary ZERO on their SET side and binary ONE on their RESET side at the beginning of the operation of the arrangement shown in FIG. 5, but it is noted that a flip-flop $FF_5$ has binary ONE on its SET side and binary ZERO on its RESET side. The flip-flop $FF_5$ has binary ZERO on its SET side when a 20-bit shift register SR is clear.

Figure 6:
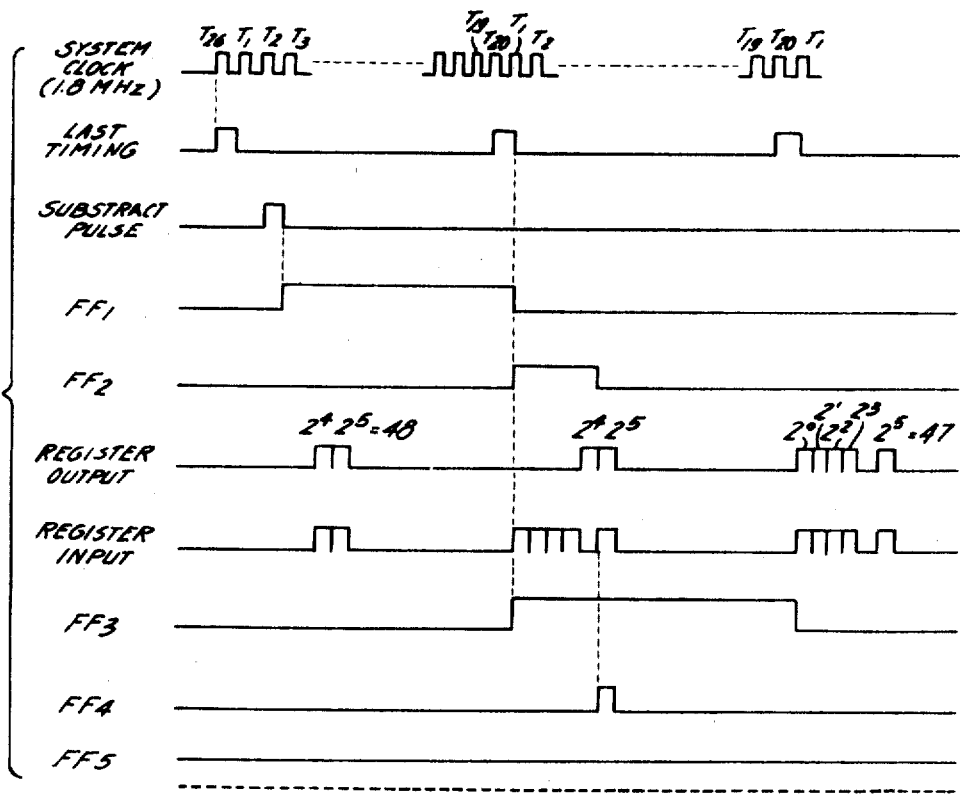
FIG. 6 is a graph showing the relationships of waveforms in FIG. 5.

With the position counter 16 and the residual distance sensor circuit 28 put at the beginning of the operation, it is assumed that the input control circuit 14 has a decimal number of 48 in the form of a binary number or 110000 to an OR gate. Then, that binary number is registered in the 20-bit shift register SR through the OR gate. The shift register SR is operative with the system clock pulses as shown in FIG. 6. Namely, the shift register SR responds to the succeeding clock pulses to succeedingly shift the binary number from the front stage toward the rear stage until the shifted binary number is applied to both an AND gate $AN_1$ at one input and the flip-flop $FF_2$ at the RESET input as a normal signal.

Since the flip-flop $FF_2$ provides its ONE RESET output at the beginning of the operation the normal signal serves to sustain ONE at the RESET output. The AND gate $AN_1$ has the other input applied with the RESET output from the flip-flop $FF_2$ the same provides at its output a binary signal of 110000 identical to the normal signal.

Then, that binary signal is again registered in the register SR through the OR gate. That is, the 110000 signal recirculates through the shift register SR until the succeeding subtract pulse occurs to initiate the next time sequence. Under these circumstances, the signal from the variable frequency oscillator 26 cooperates with the SET output signal from the flip-flop $FF_5$ (which has normally ONE on the SET side) to gate open the AND gate 30. At that time if another subtract signal occurs the flip-flop $FF_1$ is first triggered to provide ONE at the SET output. Then the ONE signal is applied to one input of an AND gate $AN_2$ and to one input to an AND gate $AN_3$.

It is noted that flip-flop $FF_1$ continues to provide ONE at the SET output until a second last timing pulse is applied thereto. In other words, the system clock pulses make one round until a twentieth one thereof appears, whereupon the second last timing pulse has occurred to be applied to the AND gate $AN_3$ at one input. As the AND gate $AN_2$ has the SET output from the flip-flop $FF_1$ applied to the other input, the application of the second last timing pulse thereto causes the same to be open to reset the flip-flop $FF_1$. On the other hand, the AND gate $AN_3$ has applied thereto the SET output from the flip-flop $FF_1$, the second last timing pulse reaches that gate to open it thereby to set the flip-flop $FF_2$.

The operation up to this point will readily be understood from the time sequence as shown in FIG. 6.

This setting of the flip-flop $FF_2$ causes the closure of the AND gate $AN_1$ and instead, the SET output from the flip-flop $FF_2$ is applied to one input to an AND gate $AN_4$ having its other input applied with the complement of the normal signal or 001111.

It will be here necessary to notice the operation of the flip-flop $FF_2$ and the output from the shift register SR. The flip-flop $FF_2$ continues to be operated until the figure on the $2^4$ place of the number $2^4+2^5=48$ changes from ONE to ZERO. Therefore the setting of the flip-flop $FF_2$ causes the closure of the AND gate $AN_1$ and the opening of the AND gate $AN_4$.

This causes the complement of the binary number 110000 to be applied to the AND gate $AN_4$. As the shift register SR has registered therein the pulses in the $2^4$ and $2^5$ places, the complement signal is being applied to the AND gate $AN_4$ until the pulse in the $2^4$ place appears as the normal signal from the shift register SR. The occurrence of the $2^4$ signal as an output from the register causes the resetting of the flip-flop $FF_2$.

Briefly, the pulse in the $2^4$ place serves to reset the flip-flop $FF_2$. The resetting of the flip-flop $FF_2$ permits the succeeding pulse in the $2^5$ place to be applied to the AND gate $AN_1$ and thence to the shift register SR through the OR gate. This results in the registering of a binary number of $1\times 2^0+1\times 2+1\times 2^2+1\times 2^3+1\times 2^4+1\times 2^5$ or a decimal number of $47=1+2+4+8+32$ which is the initially set value of 48 minus 1.

The residual distance sensor circuit 28 is operated as follows:

As above described a subtract signal causes ONE to be provided on the SET side of the flip-flop $FF_1$ forming a part of the position counter 16. Thus, the flip-flop $FF_4$ is forcedly reset while an AND gate $AN_3$ has applied to one input thereof a SET output. Under these circumstances the occurrence of a second last timing pulse opens the AND gate $AN_3$ to set the flip-flop $FF_3$. The SET output from the flip-flop $FF_3$ is applied to one input of an AND gate $AN_6$ as well as to AND gates $AN_7$, $AN_8$ and $AN_9$. On the other hand the input to the shift register SR is also applied to the AND gate $AN_7$ through an inverter N and further directly to the AND gate $AN_8$.

It is here necessary to notice the waveforms at the input to the shift register and the waveform provided by the flip-flop $FF_6$ as shown in FIG. 6. From FIG. 6 it is seen that even with the flip-flop $FF_3$ set to ONE the flip-flop $FF_4$ is allowed to be set only when the pulse in the $2^4$ place has disappeared. At that time the inverter N provides a ONE output to open the AND gate $AN_7$.

The flip-flop's $FF_1$ through $FF_5$ each are adapted to be triggered with the trailing edge of the particular pulse as previously described. Therefore at the time point when the pulse in the $2^5$ place has just disappeared the SET output is changed from ONE to ZERO. That is, when the pulse in the $2^5$ place has occurred and AND gate is in its open position while the disappearance of that pulse causes the closure of the gate. This is that time point when the SET output is changed from one to zero which, in turn, causes the flip-flop $FF_4$ to provide a pulse such as shown in FIG 6.

On the other hand, the AND gate $AN_9$ has applied thereto the SET output from the flip-flop $FF_3$ and the same is open in response to the second last timing pulse applied thereto.

However a 1 $\tau$ time delay circuit TD connected to the output of the AND gate $AN_9$ is operative to delay the output from that AND gate by a time interval corresponding to the pulse width of the system clock pulse. Also, the time delay circuit TD is adapted to provide no output when the flip-flop $FF_4$ is in its SET position. Therefore, an AND gate $AN_{10}$ is not open.

Further, the AND gate $AN_1$ is not open because the time delay circuit TD provides a ZERO output after the flip-flop $FF_4$ has been reset. Since the flip-flop $FF_5$ continues to provide a ONE output without changing from the initial output state thereof, the AND gate 30 is opened and closed in synchronization with the pulses put out by the oscillator (16).

The process as above described is repeated to cause the set value, in this case 48 to be sequentially subtracted until the register SR is clear. At that time the flip-flop $FF_5$ changes its output from ONE to ZERO thereby to close the gate 30.

Figure 7:
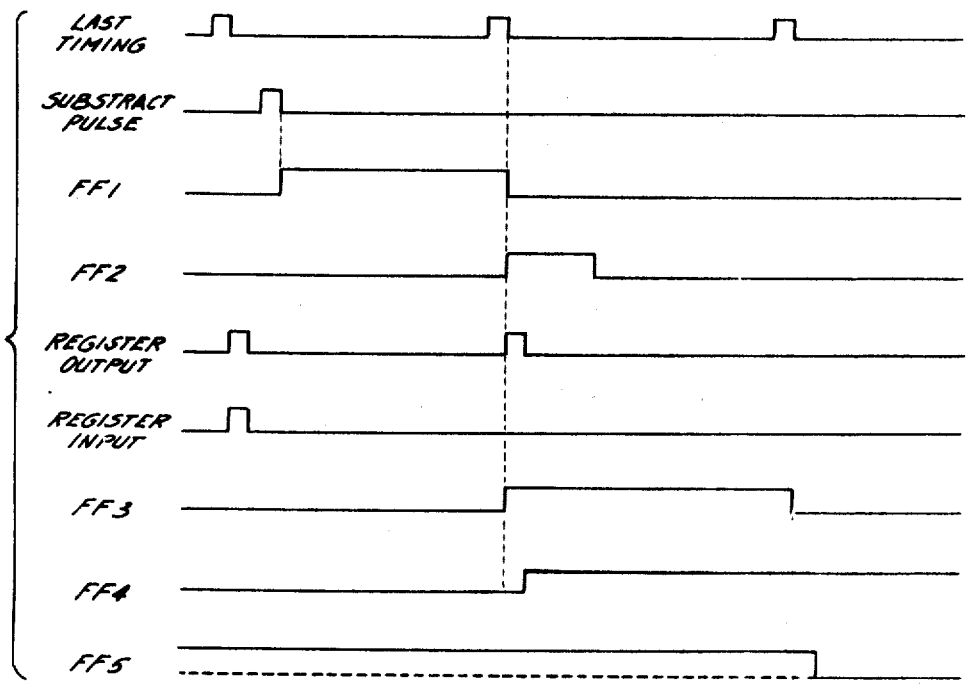
FIG. 7 is a graph, similar to FIG. 6, showing waveforms at a different time in the system's operation.

From the foregoing it will readily be understood that FIG. 7 illustrates that the subtraction of ONE renders the register clear because $1\times 2^0=1$.

While the invention has been illustrated and described in conjunction with a single preferred embodiment thereof, it is to be understood that various changes and modifications may be resorted to without departing from the spirit and scope of the invention.

What we claim is:

1. In a numerical control apparatus for a machine tool for controlling movement of a controlled member to a command position, a locating speed reduction device comprising means for providing a speed signal determined by a distance between the actual and command positions of a controlled member, means coupled to said speed signal means for comparing a given speed signal with a distance of the controlled member from the command position thereof, means coupled to said comparing means for determining a position relative to the command position from which the controlled member is to be moved at a reduced speed, and means coupled to said relative position determining means for reducing the speed of movement of the controlled member immediately before the controlled member is caused to stop at the command position.

2. In a numerical control apparatus for a machine tool, for controlling movement of a controlled member to a command position, a locating speed reduction device comprising drive means for a controlled member, first means for providing a speed information signal representing a speed of the controlled member, second means for providing a position information signal representative of a distance to which the controlled member is to be moved, voltage comparing and switching means coupled to both the first and second means to permit a speed signal from the first means to pass therethrough when the position signal is greater in magnitude than the speed signal and to permit a position signal from the second means to pass therethrough when the speed signal is greater in magnitude than the position signal, variable frequency oscillator means connected to the voltage comparing and switching means to produce pulses at a pulse repetition frequency controlled by the voltage comparing and switching means, a gate circuit interconnecting said oscillator and said second means, residual distance sensor means connected between said second means and said gate circuit to monitor said second means to permit the pulses from the variable frequency oscillator means to be applied to the second means as long as the second means has digital information still remaining therein, the pulses from the oscillator means applied to the second means being counted down by said second means to decrease the value of the digital information in the second means; position detector means for detecting the actual position of the controlled member; and phase difference detector means coupled to said drive means, said oscillator means, and said position detector means, for detecting a phase difference between the output from the variable frequency oscillator means and the output from the position detector means to provide a reduced speed signal for energizing the drive means.